(12) United States Patent
Yoneda et al.

(10) Patent No.: US 7,637,680 B2
(45) Date of Patent: Dec. 29, 2009

(54) COATING TOOL

(75) Inventors: Shigeki Yoneda, Osaka (JP); Takeshi Omatsu, Osaka (JP)

(73) Assignee: Sakura Color Products Corporation, Osaka-shi (JP)

( * ) Notice: Subject to any disclaimer, the term of this patent is extended or adjusted under 35 U.S.C. 154(b) by 652 days.

(21) Appl. No.: 10/578,129

(22) PCT Filed: Nov. 4, 2004

(86) PCT No.: PCT/JP2004/016344

§ 371 (c)(1), (2), (4) Date: May 2, 2006

(87) PCT Pub. No.: WO2005/044588

PCT Pub. Date: May 19, 2005

(65) Prior Publication Data

US 2007/0070165 A1     Mar. 29, 2007

(30) Foreign Application Priority Data

Nov. 7, 2003 (JP) ............................. 2003-377830
Nov. 7, 2003 (JP) ............................. 2003-378709

(51) Int. Cl.
*B43K 7/08* (2006.01)
(52) U.S. Cl. ..................... 401/142; 401/141
(58) Field of Classification Search ............. 401/141, 401/142; 106/287.14
See application file for complete search history.

(56) References Cited

U.S. PATENT DOCUMENTS 6,406,204 B1 * 6/2002 Omatsu et al. ............. 401/142

FOREIGN PATENT DOCUMENTS

| JP | 2000-343875 | 12/2000 |
|---|---|---|
| JP | 2001-158869 | 6/2001 |
| JP | 2002-103884 | 4/2002 |
| JP | 2002-127680 | 5/2002 |
| JP | 2002-293085 | 10/2002 |
| JP | 2003-34098 | 2/2003 |
| JP | 2003-34099 | 2/2003 |
| JP | 2003-145985 | 5/2003 |
| JP | 2004-262200 | 9/2004 |

* cited by examiner

*Primary Examiner*—David J Walczak
(74) *Attorney, Agent, or Firm*—Hamre, Schumann, Mueller & Larson, P.C.

(57) ABSTRACT

A coating tool that includes an ink containment tube, an oily ink and a backflow inhibiting material. The ink is in contact with the inhibiting material. The ink containment tube has a boundary which is in contact with the oily ink and the backflow inhibiting material. The boundary contains polyvinyl alcohol and fluorine-based surfactants, the oily ink contains a colorant, a resin, an organic solvent, and a gelling agent, and the backflow inhibiting material consists of base material components and a gelling agent which contains polyacrylic acid, the polyacrylic acid being present in an amount of 0.1 to 3 wt % with respect to the total amount of said backflow inhibiting material.

30 Claims, 1 Drawing Sheet

COATING TOOL

The description of this application claims benefit of priority based on Japanese Patent Applications No. 2003-378709 and No. 2003-377830, the entire same contents of which are incorporated by reference herein.

BACKGROUND OF THE INVENTION

1. Field of the Invention

The present invention relates to a coating tool which comprises an oily ink, and particularly, to a coating tool which can preferably be used for a correction pen which comprises an oily gel ink capable of preventing adhering matters of the oily ink and of a backflow inhibiting material on a wall surface in an ink containment tube at the time of usage and which has improved self cleanable property.

2. Description of the Prior Art

Conventionally, as base material components of a backflow inhibiting material contained in an ink containment tube of a coating tool, methods of regulating viscosity by adding microparticle silica have been known when diglycerol/ethylene oxide adducts and diglycerol/propylene oxide adducts are used.

(Patent document 1, Patent document 2)

Patent document 1: Japanese Patent Laid-Open Publication No. 2000-343875.

Patent document 2: Japanese Patent Laid-Open Publication No. 2003-34098.

However, this backflow inhibiting material is hard to obtain satisfactory elasticity as a whole and therefore, when it is stored with its pen tip directed upward, some problems occur such as ink leakage caused by dripping of a backflow inhibiting material with time passage in the ink containment tube, or generation of lots of adhering matters on a wall surface of the ink containment tube accompanying the ink consumption. Further, the backflow inhibiting material is susceptible to shock impact and the backflow inhibiting material is likely to be deformed in the ink containment tube, causing ink leakage. This is because of difficulty in imparting structural viscosity (gelatinization) with the use of microparticle silica in the case of the above mentioned base material components. It is assumed that the above mentioned base material components themselves have considerable surface activity and they are materials with high polarity, which causes inhibition of gel formation.

On the other hand, conventionally, such a correction tool has been provided that is free from adhesion of an oily ink such as correction liquid and the like to an ink containment tube with usage, that shows self cleanable property, that ensures a complete consumption of the total filling and further, that enables confirmation of the residual amount of the liquid when a transparent or translucent container is used (e.g. Patent document 3).

This patent document 3 discloses a correction tool having a coating portion for coating correction liquid which is content liquid at the tip end and containing correction liquid comprising at least an opacifying agent, a hydrocarbon-based solvent with a boiling point of 40-150° C., and a film forming agent soluble in said solvent, and housing and arranging a backflow inhibiting material which contacts with a rear boundary of this correction liquid and which comprises at least an organic solvent insoluble or hardly-soluble in a hydrocarbon-based solvent of said correction liquid and/or water, viscosity modifier, and a surfactant, in which a fluorine-based surfactant is contained as a surfactant.

Patent document 3: Japanese Patent Laid-Open Publication No. 2002-103884.

However, said correction tool has weak self cleanable property in practice and a backflow inhibiting material (an ink follower) is likely to infiltrate correction liquid with time passage.

Further, as Patent document 4, the correction tool is provided which has a coating portion for coating correction liquid which is content liquid at a tip end and a correction liquid made up at least of an opacifying agent, hydrocarbon-based solvent with a boiling point of 40 to 150° C., and a film-forming agent soluble in said solvent are contained in the side of said coating portion in a tank which contains said correction liquid, and a backflow inhibiting material contacting with a rear boundary of a correction liquid and made up at least of viscosity regulator, an organic solvent insoluble or hardly soluble in hydrocarbon-based solvent of said correction liquid and/or water is arranged, and at least an organic solvent insoluble or hardly soluble in hydrocarbon-based solvent and/or water is coated on an inner wall surface of a containment tank of said correction liquid.

Patent document 4: Japanese Patent Laid-Open Publication No. 2002-127680.

However, since said correction tool is nothing but a tool in which an organic solvent insoluble or hardly soluble in hydrocarbon-based solvent and/or water is coated on an inner wall surface of a containment tank is coated, as an organic solvent and/or water which was coated disappear/disappears with time passage and said self cleanable property is lost.

The object of the present invention is to provide coating tools such as correction tools provided with a backflow inhibiting material with satisfactory elasticity, preventing dripping and adhering matters on a wall surface accompanied by ink consumption and not susceptible to deformation against shock impact. In addition, the object of the present invention is to provide coating tools such as correction tools in which a backflow inhibiting material is hard to infiltrate in an ink and which has well sustained self cleanable effect against a backflow inhibiting material.

SUMMARY OF THE INVENTION

The present invention is a coating tool containing an oily ink and a backflow inhibiting material which contacts with said oily ink and which moves following fluidity of said oily ink in an ink containment tube, wherein said backflow inhibiting material consists of base material components of at least one selected from the group of diglycerol/ethylene oxide adducts and diglycerol/propylene oxide adducts and a gel composition which comprises polyacrylic acid, and the above mentioned polyacrylic acid is contained in 0.1 to 3 wt % with respect to the total amount of the above mentioned backflow inhibiting material.

It is preferable that the above mentioned polyacrylic acid contains polyacrylic acid whose average molecular weight is not less than 1,000,000 and it is further preferable that the above mentioned polyacrylic acid has an average molecular weight of not less than 1,000,000.

As said base material components, it is preferable that said base material components are contained in 87 to 99.9 wt % with respect to the total amount of said backflow inhibiting material.

In addition, it is preferable that said backflow inhibiting material contain microparticle silica. In particular, it is preferable to contain microparticle silica in 1 to 10 wt % with respect to the total amount of said backflow inhibiting material.

Further, when the microparticle silica is contained in the gel composition of said backflow inhibiting material, as said polyacrylic acid, polyacrylic acid with an average molecular weight of not less than 1,000,000, preferably not less than 1,500,000, more preferably, 2,000,000, and further preferably, 3,000,000 and polyacrylic acid with an average molecular weight of not greater than 2,000,000, and preferably, not greater than 1,500,000 is contained. In particular, the gel composition of a backflow inhibiting material which contains polyacrylic acid of not less than 2,000,000, and not greater than 1,500,000 is preferable.

In particular, such a gel composition of the backflow inhibiting material is preferable that contains polyacrylic acid whose average molecular weight is not less than 2,000,000 and polyacrylic acid whose average molecular weight is not greater than 1,500,000.

Moreover, it is preferable that the viscosity of said oily ink is not less than 700 mPa·s when the shearing rate is 0.1 (1/s) and not greater than 500 mPa·s when the shearing rate is 100 (1/s).

Further, it is preferable that said oily ink comprises at least one of aliphatic hydrocarbon-based solvent and an alicyclic hydrocarbon-based solvent.

Therefore, as the backflow inhibiting material, the backflow inhibiting material for an oily ink consisting of base material components selected at least one from the group of diglycerol/ethylene oxide adducts and diglycerol/propylene oxide adducts and a gel composition which comprises polyacrylic acid whose average molecular weight is not less than 1,000,000, wherein said polyacrylic acid is contained in 0.1 to 3 wt % with respect to the total amount of said backflow inhibiting material is preferable.

Further, in addition, as a resin of a containment tube suitable for a correction ink, nylon, polyethylene terephthalate resins are exemplified but since wetting of these resins is good with oily inks such as correction inks, the self cleanable effect by the backflow inhibiting material (an ink following material or an ink follower) is hard to be realized, in order to solve this problem, the inventors considered that it is necessary to improve the wetting between the backflow inhibiting material and the pipe by worsening the wetting between the oily inks and the ink containment tube and they found out that the above mentioned problem can be solved by adding polyvinyl alcohol resins as polarity resins having the bad wetting with low polarity inks, and by forming the material to which a fluorine-based surfactant is added selectively for the purpose of further worsening the wetting in a boundary which contacts at least with said oily ink.

In addition to the above mentioned structure, the preferable coating tool of the present invention is the coating tool in which said ink containment tube has a boundary contacting with said oily ink and said backflow inhibiting material and in said boundary, at least polyvinyl alcohol among polyvinyl alcohol and a fluorine-based surfactant is contained.

Also, the further preferable coating tool of the present invention is the coating tool in which said boundary is composed of a coating layer formed on an inner wall surface of said ink containment tube and at least polyvinyl alcohol among polyvinyl alcohol and a fluorine-based surfactant is contained.

It is preferable that polyvinyl alcohol and a fluorine-based surfactant are contained in said boundary. In particular, such a coating tool is preferable that contains polyvinyl alcohol and a fluorine-based surfactant and that contains ionic fluorine-based surfactant as said fluorine-based surfactant and modified polyvinyl alcohol which has opposite ionicity to that of said surfactant as said polyvinyl alcohol.

As mentioned above, since said backflow inhibiting material of the present invention consists of at least one base material component selected from the group of diglycerol/ethylene oxide adducts and diglycerol/propylene oxide adducts and a gel composition which contains polyacrylic acid, and since the backflow inhibiting material of the present invention contains the above mentioned polyacrylic acid in 0.1 to 3 wt % with respect to the total amount of said backflow inhibiting material, the coating tools such as correction tools provided with the backflow inhibiting material by which satisfactory elasticity can be retained, by which dripping with the time passage in an ink containment tube and adhering matters on a wall surface which accompanies ink consumption are prevented and which is hard to be deformed can be provided.

In addition, since the present invention relates to a coating tool in which polyvinyl alcohol and a fluorine-based surfactant are contained in a boundary which contacts with said oily ink and said backflow inhibiting material, the backflow inhibiting material is hard to infiltrate an ink and therefore, the coating tool such as correction tool and the like with said well sustained self cleanable effect can be provided. In particular, when polyvinyl alcohol and a fluorine-based surfactant are contained in said boundary and that an ionic fluorine-based surfactant as said fluorine-based surfactant and modified polyvinyl alcohol which has opposite ionicity to that of said surfactant as said polyvinyl alcohol are contained, ionic interaction between said polyvinyl alcohol and said surfactant can be had and even under the environment of exceeding a room temperature (20° C.), to be specific, even under the high temperature environment of not less than 40° C., self cleanable effect can fully be maintained and is excellent in storage stability.

BEST MODE FOR CARRYING OUT THE INVENTION

Backflow Inhibiting Material

As a backflow inhibiting material, an aqueous backflow inhibiting material (aqueous backflow inhibiting compositions and the like) can be used. To be specific, publicly known followers or backflow inhibiting compositions are used, for example, at least one of diglycerol/ethylene oxide adducts and diglycerol/propylene oxide adducts is used as a base material, however, it is further preferable that at least one of diglycerol/ethylene oxide adducts and diglycerol/propylene oxide adducts is used as a base material and that polyacrylic acid is contained in 0.1 to 3 wt % with respect to the total amount of a backflow inhibiting material.

Said polyacrylic acid with average molecular weight of not less than 1,000,000 can preferably be used, said polyacrylic acid with average molecular weight of not less than 1,250,000 can further preferably be used, said polyacrylic acid with average molecular weight of not less than 2,000,000 can more preferably be used, and said polyacrylic acid with average molecular weight of not less than 3,000,000 can most suitably be used. In addition, the maximum value of the average molecular weight to be used is preferably not greater than 10,000,000 and further preferably not greater than 4,000,000. When the average molecular weight is less than 1,000,000, the formation of gel lowers and an elastic material of a backflow inhibiting material lowers, dripping is likely to occur and deformation by shock impact is likely to occur as well. In addition, when the average molecular weight exceeds 10,000,000, it can still be used, however, since it is likely to harden, the average molecular weight is preferably not greater than 10,000,000 and further preferably not greater than 4,000,000.

It is important that said polyacrylic acid is contained in 0.1 to 3 wt % with respect to the total amount of said backflow inhibiting material. When the above mentioned polyacrylic acid is contained in less than 0.1 wt % with respect to the total amount of said backflow inhibiting material, gel is hard to be formed, an elastic material of a backflow inhibiting material becomes unsatisfactory, dripping is likely to occur and deformation by shock impact is likely to occur as well. On the other hand, when the above mentioned polyacrylic acid is contained in excess of 3 wt % with respect to the total amount of said backflow inhibiting materials, it becomes hardened and the performance of a backflow inhibiting material which follows an oily ink lowers.

As the above mentioned polyacrylic acid, cross-linked polyacrylic acid is preferable. To be specific, trade names Carbopol 941 (average molecular weight 1,250,000), Carbopol 934 (average molecular weight 3,000,000), and Carbopol 940 (average molecular weight 4,000,000) manufactured by BF Goodrich Co., Ltd. can be used.

As base material components of said backflow inhibiting material, diglycerol/ethylene oxide adducts and diglycerol/propylene oxide adducts can be exemplified. As diglycerol/ethylene oxide adducts, for example, polyoxyethylene (n) diglycerol ether can be used, and trade names SC-E 2000 (ethylene oxide 40 mol adducts) and SC-E 1500 (ethylene oxide 30 mol adducts) manufactured by Sakamoto Yakuhin Kogyo Co., Ltd. can be used as preferable specific examples.

Although each of said diglycerol/ethylene oxide adducts and said diglycerol/propylene oxide adducts can be used selectively, they can be used in mixtures. Such base material components are preferably contained in 87 to 99.9 wt % with respect to the total amount of said backflow inhibiting material. When said base material components are contained in less than 87 wt % with respect to the total amount of said backflow inhibiting material, it becomes hard and the performance of the backflow inhibiting material which follows an oily ink deteriorates. When said base material components are contained in excess of 99.9 wt % with respect to the total amount of said backflow inhibiting material, the additional amount of polyacrylic acid becomes little and therefore, elasticity of the backflow inhibiting material becomes unsatisfactory, dripping is likely to occur and deformation by shock impact is likely to occur as well.

(Microparticle Silica)

In the present invention, it is important that said polyacrylic acid is used instead of microparticle silica in the relationship of diglycerol/ethylene oxide adducts and diglycerol/propylene oxide adducts. In other words, it is due to the fact that in the case of the above mentioned base material components, imparting structural viscosity (gelatinization) by microparticle silica is difficult when microparticle silica is used together with diglycerol/ethylene oxide adducts and diglycerol/propylene oxide adducts as already mentioned. It is assumed that said base material components themselves have considerable surface activity and are materials with high polarity, which causes inhibition of gel formation. On the other hand, when said polyacrylic acid is used instead of microparticle silica with respect to diglycerol/ethylene oxide adducts and diglycerol/propylene oxide adducts, since the average molecular weight of polyacrylic acid to be used is large, viscosity of said base material components is remarkably increased and is gelatinized, and therefore, a backflow inhibiting material retains satisfactory elasticity, which prevents dripping with the time passage in an ink containment tube and adhering matters on a wall surface which accompanies ink consumption and also, backflow inhibiting material is unlikely to be deformed against shock impact.

In this regard, although it is desirable that said polyacrylic acid is used alone instead of microparticle silica, it was found that by using the microparticle silica together with said polyacrylic acid and said base material components in a specific amount, viscoelasticity can be controlled at discretion while retaining satisfactory elasticity as a backflow inhibiting material. By this, a backflow inhibiting material tailored for ink viscosity and required ink flowing amount can be obtained. To be specific, it is desirable that said polyacrylic acid is contained in 0.1 to 3 wt % with respect to the total amount of said backflow inhibiting material, said base material components are contained in 87 to 99.9 wt % with respect to the total amount of said backflow inhibiting material, and that the microparticle silica is contained in 1 to 10 wt % with respect to the total amount of said backflow inhibiting material.

As microparticle silica which can be used in the present invention, both hydrophilic and hydrophobic silica can be used and the specific examples include trade names "AEROSIL #380" (hydrophilic silica, average diameter of primary particle 7 μm), "AEROSIL #200" (hydrophilic silica, average diameter of primary particle 12 μm), "AEROSIL R-972" (hydrophobic silica, surface treatment by dimethylchulorosilane, average diameter of primary particle 16 μm), "AEROSIL R-976" (hydrophobic silica, surface treatment by dimethylchlorosilane, average diameter of primary particle 7 μm), and "AEROSIL R-812" (hydrophobic silica, surface treatment by hexamethyldisilazane, average diameter of primary particle 7 μm).

In addition, in the case of said backflow inhibiting material which contains such microparticle silica in a gel composition, as said polyacrylic acid used in the present invention, it is preferable that said polyacrylic acids are composed of a plurality of polyacrylic acids with different average molecular weight, comprising polyacrylic acids whose average molecular weight is not less than 1,000,000 and preferably, not less than 1,500,000, more preferably, not less than 2,000,000, and most suitably, not less than 3,000,000 and at the same time comprising polyacrylic acids whose average molecular weight is lower than above mentioned ones, respectively. To be specific, it is preferable to contain polyacrylic acid whose average molecular weight is not greater than 2,000,000, preferably not greater than 1,500,000, further preferably not greater than 1,250,000, and more preferably not greater than 1,000,000. In such combinations of average molecular weight, when said backflow inhibiting material is made up of polyacrylic acid showing the molecular weight distribution with a plurality of peaks or synthesized one peak using polyacrylic acid with a plurality of average molecular weight, syneresis (a phenomenon that a base material starts to bleed from a backflow inhibiting material with time passage) of said base material or a base material mentioned later from the already mentioned gel composition of a backflow inhibiting material (a backflow inhibiting material composition) of the present invention can be prevented.

When syneresis occurs, when the pen tip is directed upward, thinning of a backflow inhibiting material occurs, causing an ink leakage, or viscosity increases causing incorrect follow-up. Such syneresis of base materials from a backflow inhibiting material composition is acknowledged to occur when microparticle silica is contained in said backflow inhibiting material (composition), however, it is assumed that by further adding polyacrylic acid with low molecular weight as mentioned above, said polyacrylic acid acts as a dispersant and prevents microparticle silica from agglomerating thereby inhibiting the generation of the above mentioned syneresis.

For information, the gel composition (a backflow inhibiting material composition) composed of a plurality of polyacrylic acid with different average molecular weight and comprising polyacrylic acid with an average molecular weight of not less than 2,000,000 and not greater than 1,500,000 is most preferable.

As other additional components, a surfactant, an anti-oxidant, an antiseptic mildew-proofing agent, a fungicide and the like can be compounded at discretion in a backflow inhibiting material as required.

As a method for manufacturing a backflow inhibiting material, for example, each of the above prescribed components is dispersed by a roll mill thereby obtaining a backflow inhibiting material of the present invention.

(Oily Ink)

As said oily ink, a coating tool which comprises a colorant, a resin, an organic solvent, and a gelling agent is preferable, however, it is not restricted to this.

In addition, in the case of correction tools such as correction pens and the like, it is preferable that titanium oxide is contained in the oily ink as a colorant (an opacifying agent) and that at least one of aliphatic hydrocarbon solvent and alicyclic hydrocarbon solvent is contained in the oily ink.

Further, as the above mentioned gelling agent, it is desirable that the gelling agent is a dissoluble gelling agent which has solubility (20° C.) to the above mentioned organic solvent of 0.1 to 20 wt % and that ink viscosity is not less than 700 mPa·s when the sheer rate is 0.1 (1/s) and not greater than 500 mPa·s when the sheer rate is 100 (1/s) and that a metal soap is contained as a specific gelling agent. In particular, it is desirable to contain aluminum 2-ethylhexanoate.

For information, the measuring condition of this viscosity is shown based on the viscosity (mPa·s) when the shear force is imparted to the ink by the rotation of a ball using a correction pen with a pen tip retaining a ball whose top end diameter is 1.00 mm with an interval of 60 μm. In addition, the viscosity of the oily ink shown in the present invention is a value measured by a Z20DIN rotor at a temperature of 20° C. using a rheometer RS-75 manufactured by HAAKE GmbH.

By the combinations of the structural viscosity of said backflow inhibiting material and the viscosity of this oily ink (a correction ink), a coating tool which contains further preferable backflow inhibiting material with good ink fluidity and following property retaining elasticity as well can be obtained.

(Ink Containment Tube)

It is important that an ink containment tube used in the present invention is not eroded by aliphatic, alicyclic hydrocarbon-based solvent (not liquid-absorbing) and is not eroded by a backflow inhibiting base material (a polar substance).

An ink containment tube which satisfies these conditions is preferably composed of a resin selected from the group of a nylon resin, a polyethylene terephthalate resin, and a polybutylene terephthalate resin. To be specific, 4,6-nylon, 6-nylon, 6,6-nylon, 6,10-nylon, 6,12-nylon, 11-nylon, 12-nylon, PET (polyethylene terephthalate), and PBT (polybutylene terephthalate) can be exemplified. From the view point that residual quantity can be acknowledged from outside, nylon resins and PET (polyethylene terephthalate) are preferable. As mentioned later, when polyvinyl alcohol and a fluorine-based surfactant are comprised in a boundary of an ink containment tube which contacts at least with an oily ink, by making the ink containment tube of nylon resins and PET (polyethylene terephthalate) or PBT (polybutylene terephthalate), formation of an ink streak (passage) in an ink containment tube with time passage can be prevented and outward leakage of an ink from the ink streak (passage) and loss of an ink storage due to scattering of a solvent can be prevented. In this regard, it is desirable that said ink containment tube is made up of resins selected from the group of nylon resins, polyethylene terephthalate and polybutylene terephthalate.

In the present invention, such a coating tool is preferable in which said ink containment tube has a boundary which contacts with said oily ink and said backflow inhibiting material and in which at least polyvinyl alcohol among polyvinyl alcohol (PVA) and fluorine-based surfactant is contained in said boundary. Such a coating tool is further preferable in which polyvinyl alcohol and fluorine-based surfactant are contained in said boundary.

As said PVA (polyvinyl alcohol), PVA which includes much of —OH group (hydroxyl group) which has high polarity is desirable. In this sense, PVA with complete saponification-types or PVA with substantially complete saponification-types are desirable, however, PVA with partial saponification-types can be used. More preferable PVA is PVA with complete saponification-types or PVA with substantially complete saponification-types, and for example, PVA with degree of saponification of not less than 98.0 is preferable. To be specific, complete saponification-types are preferable and trade names "KURARAY POVAL" series including PVA-102, PVA-103, PVA-104A, PVA-105, PVA-110, PVA-117, PVA-117H, PVA-120, PVA-124, PVA-135, and PVA-HC manufactured by KURARAY CO., LTD. can be used. Among them, "KURARAY POVAL PVA105" (degree of saponification 98 to 99 mol %, degree of copolymerization 500) is preferable. Others including NH-trade names "GOSENOL N-type poval" series including NH-26, NH-20, NH-18, N-300, NM-14, NM-11, and NL-05 manufactured by The Nippon Synthetic Chemical Industry Co., Ltd. are preferable. In addition, trade names "V series" including VC-20, V, and VC-10 and trade names "J series" including JC-25, JF-20, JF-17, JF-17L, JF-10, JF-05, and JF-04 can be used.

When a coating layer composing a boundary which contacts with an oily ink is used as a base, PVA is contained in 0.05 to 20 wt % and preferably contained in 0.5 to 10 wt % with respect to the total amount of said coating liquid. When PVA is contained in less than 0.005 wt % with respect to the total amount of said coating liquid, self cleanable ability to said oily ink lowers. On the other hand, when PVA is contained in excess of 20 wt % with respect to the total amount of said coating liquid, viscosity becomes too much and coating becomes difficult.

Further, in the present invention, other than unmodified PVA (unmodified polyvinyl alcohol), in order to secure storage stability capable of satisfactorily maintaining self cleanable effect even under the environment of the temperature which exceeds over a room temperature, to be specific, under the high temperature environment of not less than 40° C., unmodified PVA (polyvinyl alcohol) with a cationic property and an anionic property can be used. In other words, such (water-soluble) PVA (polyvinyl alcohol) which comprises much —OH group (hydroxyl group) and with high polarity is preferable, and cationic modified PVA (polyvinyl alcohol) or anionic modified PVA (polyvinyl alcohol) of complete saponification-types or of substantially complete saponification-types are preferable, and for example, PVA with the degree of saponification of not less than 86.0 is preferable. As more preferable PVA, to be specific, ion modified polyvinyl alcohol such as a trade name "KURARAY POVAL KL-118" manufactured by KURARAY CO., LTD. (anionic modified polyvinyl alcohol, the degree of saponification 95 to 99 mol %) and a trade name "KURARAY POVAL CM-318" manufactured by the same (cationic modified polyvinyl alcohol, quaternary ammonium modified PVA, the degree of saponification 86 to 91 mol %), a trade name "GOHSEFIMER K210" series (cationic modified polyvinyl alcohol) manufactured by The Nippon Synthetic Chemical Industry Co., Ltd., and the like are exemplified.

When a coating layer composing a boundary which contacts with an oily ink is used as a base, such ion modified PVA is contained in 0.05 to 10 wt % (not greater than 20 wt % combining with unmodified PVA) and preferably contained in 0.1 to 5 wt % with respect to the total amount of said coating liquid. When PVA is contained in less than 0.05 wt % with respect to the total amount of said coating liquid, self cleanable ability to said oily ink lowers. On the other hand, when PVA is contained in excess of 20 wt % with respect to the total amount of said coating liquid, viscosity becomes too much and coating becomes difficult.

As fluorine-based surfactant used in the present invention, it is important that said surfactant is not dissolved in an ink solvent (an organic solvent of aliphatic hydrocarbon-based solvent or an alicyclic hydrocarbon-based solvent) and have an effect of remarkably lowering surface tension, while having solubility in water. Ionic fluorine-based surfactant is preferable. To be specific, S-111, 112, 113, 121, 131, 132, 141, and 145 of trade names Surflon series manufactured by SEIMI CHEMICAL Co., Ltd. can be exemplified. Further, 100, 150, 300, and 400S of trade names "FTERGENT" series manufactured by NEOS Co., Ltd. and EF-101, 102, 104, 105, and 112 of tradenames "FTOP" series manufactured by Mitsubishi Materials Corporation can be exemplified.

When a coating layer composing a boundary which contacts with an oily ink is used as a base, said fluorine-based surfactant is contained in 0.005 to 1 wt % and preferably contained in 0.03 to 0.5 wt % with respect to the total amount of said coating liquid. When said fluorine-based surfactant is contained in less than 0.005 wt % with respect to the total amount of said coating liquid, it is difficult to lower surface tension, while on the other hand, when said fluorine-based surfactant is contained in excess of 1 wt %, said fluorine-based surfactant is liable to be eluted out from the surface of coating layer into the oily ink.

As coating liquid forming the above mentioned coating layer, although it is important that at least polyvinyl alcohol is contained among PVA and fluorine-based surfactant, it is preferable that the coating liquid is used as coating aqueous solution. Therefore, it is preferable that 0.05 to 20 wt % of said PVA with respect to the total amount of the coating solution is added and that 0.005 to 1 wt % of said fluorine-based surfactant with respect to the total amount of the coating solution is added to prepare a coating aqueous solution. To coating aqueous solution, an anti foaming agent, a surface tension regulator, an antiseptic agent and the like may be added.

The coating tools of the present invention can be obtained by the following method, for example. That is, a molded containment tube is dipped in an aqueous solution of PVA and fluorine-based surfactant thereby forming a coating layer of the aqueous solution of PVA and fluorine-based surfactant in an inner wall surface of said containment tube. Subsequently, the coating layer is dried by an oven or by being left for a day at a room temperature. Then, an oily ink is filled in this containment tube, and further, a backflow inhibiting material (a backflow inhibiting valve) is filled. By this, a coating tool of one embodiment of the present invention is obtained.

In addition, in order to form a boundary of an inner surface of a containment tube in the present invention, other than forming a coating layer by dipping as mentioned above, and other than forming a coating layer by directly coating in the above mentioned containment tube, forming an inner layer having a boundary at least containing polyvinyl alcohol among PVA and fluorine-based surfactant is also available at the same time with molding the ink containment tube in the inner surface of a containment tube by a publicly known method such as extrusion molding and injection molding. Further, after molding an ink containment tube, an inner layer having a boundary containing at least polyvinyl alcohol among PVA and fluorine-based surfactant can be molded as a molding inside of the ink containment tube, or after molding an inner layer having a boundary containing at least polyvinyl alcohol among PVA and fluorine-based surfactant as a molding, the main material of an ink containment tube can be molded as a molding.

Or, further, the boundary which contacts with an oily ink and a backflow inhibiting material by containing at least polyvinyl alcohol among PVA and fluorine-based surfactants in a resin of an ink containment tube selected from the group of a nylon resin, a polyethylene terephthalate resin, and a polybutylene terephthalate resin can be composed as a boundary which at least contains polyvinyl alcohol among PVA and fluorine-based surfactant.

As a specific embodiment of the present invention, a coating tool in which an oily ink and a backflow inhibiting material contacting with said ink are contained in an ink containment tube, wherein the above mentioned ink containment tube has said oily ink and a boundary contacting with said backflow inhibiting material, and at least polyvinyl alcohol among polyvinyl alcohol and fluorine-based surfactant is contained in said boundary can be exemplified.

And although not specifically limited, as already mentioned, it is desirable that said ink containment tube is made up of a resin selected from a nylon resin, a polyethylene terephthalate resin, and a polybutylene terephthalate resin. These are preferable in that they have antifouling property and non-absorbing property to aliphatic hydrocarbon-based solvents or alicyclic hydrocarbon-based solvents, and are also preferable in that they have antifouling property to a backflow inhibiting valve (a backflow inhibiting material) of polar substances.

To be specific, 4,6-nylon, 6-nylon, 6,6-nylon, 6,10-nylon, 6,12-nylon, 11-nylon, 12-nylon, PET (polyethylene terephthalate), and PBT (polybutylene terephthalate) are preferable. From the view point of being capable of confirming the remaining amount from outside, nylons in general and PET are preferable.

In addition, it is most suitable to employ the above mentioned backflow inhibiting material, that is, a backflow inhibiting material consisting of at least one base material component selected from the group of diglycerol/ethylene oxide adducts and diglycerol/propylene oxide adducts and a gel composition which comprises polyacrylic acid, wherein the above mentioned polyacrylic acid is contained in 0.1 to 3 wt % with respect to the total amount of said backflow inhibiting material in said ink containment tube in which at least polyvinyl alcohol is contained in the boundary, however, it is not specifically limited. Even a coating tool in which at least an oily ink is contained in an ink containment tube, above mentioned ink containment tube has a boundary contacting at least with said oily ink, and at least polyvinyl alcohol among polyvinyl alcohol and fluorine-based surfactant are contained in said boundary, it can be employed as a coating tool provided with self cleanable property at least to the oily ink.

The most suitable coating tool is a coating tool in which an oily ink and a backflow inhibiting material contacting with said ink are contained, wherein the above mentioned ink containment tube is made up of a resin selected from the group of a nylon resin, a polyethylene terephthalate resin, and a polyebutylene terephthalate resin, and the above mentioned ink containment tube has a boundary which contacts with said oily ink and said backflow inhibiting material, and polyvinyl alcohol and fluorine-based surfactant are contained in said boundary, and ionic fluorine-based surfactant is contained as said fluorine-based surfactant, and modified polyvinyl alcohol which has opposite ionicity to that of said surfactant is contained as said polyvinyl alcohol, said oily ink contains a colorant, a resin, an organic solvent, and gelling agent, and at least an organic solvent among either of aliphatic hydrocarbon-based solvent or an alicyclic hydrocarbon-based solvent as said organic solvent, and a metal soap is contained as said gelling agent, and said backflow inhibiting material is composed of base material components and a gelling agent which contains polyacrylic acid, and the above mentioned polyacrylic acid is contained in 0.1 to 3 wt % with respect to the total amount of said backflow inhibiting material.

In addition, as a coating tool, other than a coating tool with a refilling structure provided with an ink containment tube in an outer tube, such a coating tool can also be used with a pen tip at one end of said ink containment tube and a pressure device pressurizing at least an oily ink contained in said ink containment tube at the other end.

Figure 1:
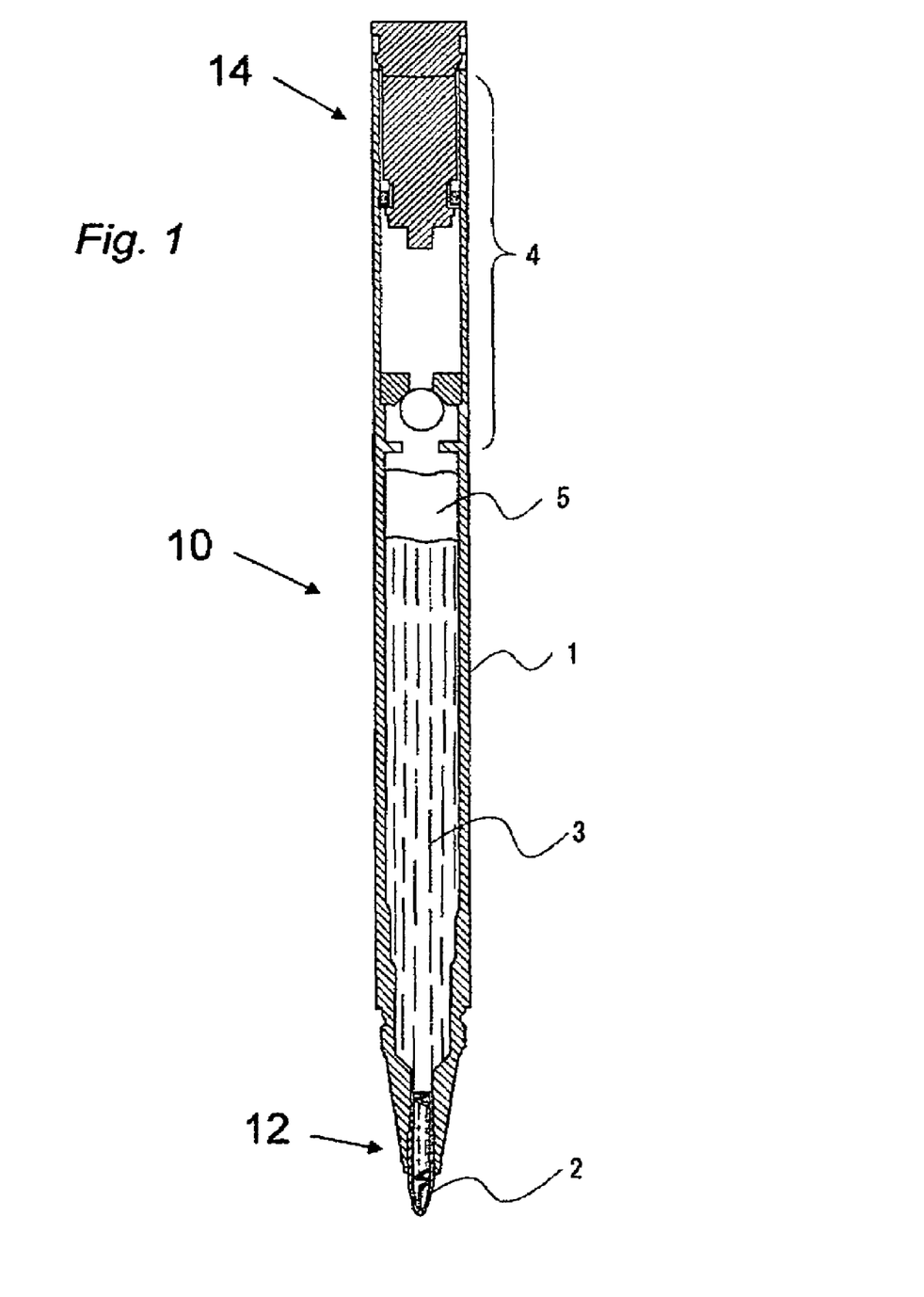
FIG. 1 is a cross-sectional view of one embodiment of the disclosed coated tool.

FIG. 1 shows one embodiment of the disclosed coating tool. The coating tool 10 includes an ink containment tube 1. The coating tool 10 further includes a pen tip 2 on a first end 12 of the ink containment tube 1, and a pressure device 4 on a second end 14 of the ink containment tube 1. The coating tool 10 also includes an oily ink 3 within the ink containment tube 1 and proximate to the pen tip 2. A backflow inhibiting material 5 is provided between the pressure device 4 and the ink oily ink 3.

Examples

A pen tip with a ball diameter of 1 mm was assembled to one end of a transparent ink containment tube whose caliber (inner diameter) is 4 mm molded by 11-nylon resin, followed by filling an oily ink which contains 50 wt % of titanium oxide, 4 wt % of a rosin resin, 40 wt % of an aliphatic hydrocarbon-based solvent, and 1.5 wt % of a gelling agent (aluminum 2-ethylhexaonate) with respect to the total amount of the oily ink in said ink containment tube, further followed by filling a composition of a backflow inhibiting material related to the Example of a composition shown in Table 1 on said oily ink. Further, for comparison, like the above, instead of a composition shown in the Table 1, a composition of a backflow inhibiting material related to a composition shown in Table 2 was filled. For information, no coating treatment was made mentioned later which contains PVA and fluorine-based solvent in this ink containment tube.

Next, regarding the correction ball-point pen which contains a backflow inhibiting material with a composition shown in Tables 1 and 2, respectively, storage property under the state where the pen tip is directed upward and following property of a backflow inhibiting material to an oily ink when written on paper were evaluated. The results are shown in each Table.

The evaluation was made based on the criteria that ○ for good storage property, X for bad storage property with dripping, ○ for good ink following property, and X for bad ink following property. All of them are based on external observation.

Further, regarding the above storage property, the evaluation is made to the state of 1 month later under the temperature of 50° C.

TABLE 1

(wt %)

| Backflow inhibiting material composition (trade name) | Example | | | | | | | | | | |
|---|---|---|---|---|---|---|---|---|---|---|---|
| | 1 | 2 | 3 | 4 | 5 | 6 | 7 | 8 | 9 | 10 | 11 |
| SC-E2000 | 98.0 | 97.0 | | | | 95.0 | | 94.5 | | | |
| SC-E1500 | | | 98.5 | | | | 95.0 | | | 92.5 | |
| SC-P1000 | | | | 98.5 | | | | | 94.5 | | |
| SC-P750 | | | | | 99.9 | | | | | | 92.9 |
| Carbopol 940 | 2.0 | 3.0 | | | 0.1 | 1.0 | 1.0 | 0.5 | 0.5 | 0.5 | 0.1 |
| Carbopol 934 | | | 1.5 | 1.5 | | | | | | | |
| Aerosil R-972 | | | | | | 4.0 | | 5.0 | | 7.0 | |
| Aerosil #380 | | | | | | | 4.0 | | 5.0 | | 7.0 |
| Evaluation Storage property of back inhibiting material (dripping or not) | ○ | ○ | ○ | ○ | ○ | ○ | ○ | ○ | ○ | ○ | ○ |
| Following property to an oily ink | ○ | ○ | ○ | ○ | ○ | ○ | ○ | ○ | ○ | ○ | ○ |

Note)
SC-E2000: diglycerin/ethylene oxide adducts, manufactured by Sakamoto Yakuhin Kogyo Co., Ltd. ethylene oxide 40 mol adducts
SC-E1500: diglycerin/ethylene oxide adducts, manufactured by Sakamoto Yakuhin Kogyo Co., Ltd. ethylene oxide 30 mol adducts
SC-P1000: diglycerin/propylene oxide adducts, manufactured by Sakamoto Yakuhin Kogyo Co., Ltd. propylene oxide 14 mol adducts
SC-P750: diglycerin/propylene oxide adducts, manufactured by Sakamoto Yakuhin Kogyo Co., Ltd. propylene oxide 9 mol adducts
Carbopol 940: cross linking polyacrylic acid, manufactured by BF Goodrich Co., Ltd., average molecular weight 4,000,000
Carbopol 934: cross linking polyacrylic acid, BF Goodrich Co., Ltd., average molecular weight 3,000,000
Aerosil R-972: hydrophobic silica, manufactured by Nippon Aerosil Co., Ltd., average diameter of primary particle 16 μm
Aerosil #380: hydrophilic silica, manufactured by Nippon Aerosil Co., Ltd., average diameter of primary particle 7 μm

TABLE 2

(wt %)

| Backflow inhibiting material composition (trade name) | Example | | | | | | | | |
|---|---|---|---|---|---|---|---|---|---|
| | 1 | 2 | 3 | 4 | 5 | 6 | 7 | 8 | 9 |
| SC-E2000 | 95.0 | 96.0 | | | | | | | |
| SC-E1500 | | | 96.0 | | 93.0 | | 90.0 | 85.0 | |
| SC-P1000 | | | | 95.0 | | | | | |
| SC-P750 | | | | | | 93.0 | | | 85.0 |
| Carbopol 940 | 5.0 | | | | | | | | |
| Carbopol 934 | | | | | | | | | |
| Aerosil R-972 | | 4.0 | | | 7.0 | | | 15.0 | |
| Aerosil #380 | | | 4.0 | 5.0 | | 7.0 | 10.0 | | 15.0 |
| Evaluation — Storage property of back inhibiting material (dripping or not) | ○ | X | X | X | X | X | X | X | X |
| Evaluation — Following property to an oily ink | X | ○ | ○ | ○ | ○ | ○ | ○ | ○ | ○ |

Note)
SC-E2000: diglycerin/ethylene oxide adducts, manufactured by Sakamoto Yakuhin Kogyo Co., Ltd. ethylene oxide 40 mol adducts
SC-E1500: diglycerin/ethylene oxide adducts, manufactured by Sakamoto Yakuhin Kogyo Co., Ltd. ethylene oxide 30 mol adducts
SC-P1000: diglycerin/propylene oxide adducts, manufactured by Sakamoto Yakuhin Kogyo Co., Ltd. propylene oxide 14 mol adducts
SC-P750: diglycerin/propylene oxide adducts, manufactured by Sakamoto Yakuhin Kogyo Co., Ltd. propylene oxide 9 mol adducts
Carbopol 940: cross linking polyacrylic acid, manufactured by BF Goodrich Co., Ltd., average molecular weight 4,000,000
Carbopol 934: cross linking polyacrylic acid, BF Goodrich Co., Ltd., average molecular weight 3,000,000
Aerosil R-972: hydrophobic silica, manufactured by Nippon Aerosil Co., Ltd., average diameter of primary particle 16 μm
Aerosil #380: hydrophilic silica, manufactured by Nippon Aerosil Co., Ltd., average diameter of primary particle 7 μm From Tables 1 and 2, when a coating tool is composed of at least one base material component selected from the group of diglycerol/ethylene oxide adducts and diglycerol/propylene oxide adducts and a gel composition with average molecular weight of not less than 1,000,000, wherein the above mentioned polyacrylic acid is contained in 0.1 to 3 wt % with respect to the total amount of said backflow inhibiting material, it was observed that dripping of the backflow inhibiting material with the time passage did not occur and had good storage property and also, had good following property to the outflow of an oily ink in an ink containment tube.

A coating tool of the present examples has satisfactory elasticity, preventing adhering matters of an oily ink on a wall surface in an ink containment tube at the time of usage, and is provided with a backflow inhibiting material which is hard to be deformed to the shock impact.

Therefore, problems of ink leakage caused by dripping of a backflow inhibiting material with time passage in the ink containment tube, or generation of lots of adhering matters on a wall surface of the ink containment tube are prevented and since the coating tool has shock resistance, the backflow inhibiting material is hard to be deformed in the ink containment tube, and therefore, in this regard, ink leakage can be prevented.

Next, microparticle silica was further added and except for the composition shown in the Table 3, with the same methods shown said examples, storage property when the pen tip was directed upward, following property of a backflow inhibiting material when written on paper, and syneresis at the time of storage was evaluated, modifying the backflow inhibiting material and manufacturing a ball-point pen for correction. Dripping is a phenomenon that the backflow inhibiting material is deformed with time passage and what is evaluated at the time of storage when the pen tip is directed upward is as evaluated in the already mentioned example. Syneresis was evaluated based on the criteria that when the base material component is eluted out from the backflow inhibiting material with time passage, it was evaluated as X, and when not, evaluated as ○. Table 3 shows the results. Above mentioned storage property and syneresis at the time of storage are the evaluation of the state of 1 month later under the temperature of 50° C. In addition, Table 3 relates to a coating tool with a backflow inhibiting material which contains microparticle silica and polyacrylic acid with an average molecular weight of not less than 2,000,000, and polyacrylic acid with lower average molecular weight of not greater than 2,000,000, not greater than 1,500,000, not greater than 1,250,000, and not greater than 1,000,000. Table 4 relates to a coating tool containing polyacrylic acid whose average molecular weight is not less than 2,000,000.

TABLE 3

(wt %)

| Backflow inhibiting material (trade name) | Molecular weight (10,000) | Example 12 | 13 | 14 | 15 | 16 | 17 | 18 | 19 | 20 | 21 |
|---|---|---|---|---|---|---|---|---|---|---|---|
| SC-E2000 | — | 93.0 | 92.5 | 92.0 | 93.5 | 93.0 | 93.0 | 93.0 | 93.0 | 93.0 | 93.0 |
| Carbopol940 | 400 | 1.0 | 1.0 | 1.0 | 0.5 | 1.0 | 1.0 | 1.0 | 1.0 | | |
| Carbopol934 | 300 | | | | | | | | | 1.0 | |
| Carbopol941 | 125 | 1.0 | 1.5 | 2.0 | 1.0 | | | | | 1.0 | |
| JunronPW-110 | 100 | | | | | 1.0 | | | | | |
| JunronPW-111 | 10 | | | | | | 1.0 | | | | |
| JunronPW-150 | 200 | | | | | | | 1.0 | | | 1.0 |
| AcpecHV-501E | 150 | | | | | | | | 1.0 | | 1.0 |
| Aerosil R-972 | | 5.0 | 5.0 | 5.0 | 5.0 | 5.0 | 5.0 | 5.0 | 5.0 | 5.0 | 5.0 |
| Evaluation | Storage property of back inhibiting material (dripping or not) | ○ | ○ | ○ | ○ | ○ | ○ | ○ | ○ | ○ | ○ |
| | Following property to oily ink | ○ | ○ | ○ | ○ | ○ | ○ | ○ | ○ | ○ | ○ |
| | Syneresis at the time of storing back inhibiting material | ○ | ○ | ○ | ○ | ○ | ○ | ○ | ○ | ○ | ○ |

Note)
SC-E2000: diglycerin/ethylene oxide adducts, manufactured by Sakamoto Yakuhin Kogyo Co., Ltd. ethylene oxide 40 mol adducts
Carbopol 940: cross linking polyacrylic acid, manufactured by BF Goodrich Co., Ltd., average molecular weight 4,000,000
Carbopol 934: cross linking polyacrylic acid, BF Goodrich Co., Ltd., average molecular weight 3,000,000
Carbopol 941: cross linking polyacrylic acid, BF Goodrich Co., Ltd., average molecular weight 1,250,000
Junron PW-110, cross linking polyacrylic acid, manufactured by NIHON JUNYAKU Co., Ltd., average molecular weight 1,000,000
Junron PW-111, cross linking polyacrylic acid, manufactured by NIHON JUNYAKU Co., Ltd., average molecular weight 100,000
Junron PW-150, cross linking polyacrylic acid, manufactured by NIHON JUNYAKU Co., Ltd., average molecular weight 2,000,000
ACVEC HV-501E, cross linking polyacrylic acid, manufactured by SUMITOMO SEIKA CHEMICALS Co., Ltd., average molecular weight 1,500,000
Aerosil R-972: hydrophobic silica, manufactured by Nippon Aerosil Co., Ltd., average diameter of primary particle 16 μm

TABLE 4

(wt %)

| Backflow inhibiting material composition (trade name) | Molecular weight (10,000) | Comparative Example 10 | 11 |
|---|---|---|---|
| SC-E2000 | — | 94.0 | 93.0 |
| Carbopol 940 | 400 | 1.0 | 2.0 |
| Carbopol 934 | 300 | | |
| Carbopol 941 | 125 | | |
| Junron PW-110 | 100 | | |
| Junron PW-111 | 10 | | |
| Junron PW-150 | 200 | | |
| Acpec HV-501E | 150 | | |
| Aerosil R-972 | | 5.0 | 5.0 |
| Evaluation | Storage property of backflow inhibiting material (dripping or not) | ○ | ○ |
| | Following property to oily ink | ○ | ○ |
| | Syneresis at the time of storing backflow inhibiting material | X | X |

Note)
SC-E2000: diglycerin/ethylene oxide adducts, manufactured by Sakamoto Yakuhin Kogyo Co., Ltd. ethylene oxide 40 mol adducts
Carbopol 940: cross linking polyacrylic acid, manufactured by B F Goodrich Co., Ltd., average molecular weight 4,000,000
Carbopol 934: cross linking polyacrylic acid, B F Goodrich Co., Ltd., average molecular weight 3,000,000
Carbopol 941: cross linking polyacrylic acid, B F Goodrich Co., Ltd., average molecular weight 1,250,000
Junron PW-110, cross linking polyacrylic acid, manufactured by NIHON JUNYAKU Co., Ltd., average molecular weight 1,000,000
Junron PW-111, cross linking polyacrylic acid, manufactured by NIHON JUNYAKU Co., Ltd., average molecular weight 100,000
Junron PW-150, cross linking polyacrylic acid, manufactured by NIHON JUNYAKU Co., Ltd., average molecular weight 2,000,000
Acpec HV-501E, cross linking polyacrylic acid, manufactured by SUMITOMO SEIKA CHEMICALS Co., Ltd., average molecular weight 1,500,000
Aerosil R-972: hydrophobic silica, manufactured by Nippon Aerosil Co., Ltd., average diameter of primary particle 16 μm From Tables 3 and 4, in the case of a backflow inhibiting material which contains microparticle silica, it is observed that a coating tool containing a plurality of average molecular weight and containing polyacrylic acid with an average molecular weight of not less than 2,000,000, and containing polyacrylic acid with lower average molecular weights of not greater than 2,000,000, not greater than 1,500,000, not greater than 1,250,000, and not greater than 1,000,000 prevents syneresis of a base material, while retaining storage property in a state where the pen tip is directed upward and following property of a backflow inhibiting material to an oily ink written on paper.

Next, a transparent ink containment tube whose caliber (inner diameter) is 4 mm molded by 11-nylon resin was dipped in each aqueous coating solution shown in Table 5. An aqueous coating liquid is composed of a composition of treatment liquid shown in Table 5 and for example, in a coating tool of the Example 22, PVA is so adjusted to be contained in 5 wt % with respect to the total amount of coating liquid and said fluorine-based surfactant is contained in 0.15 wt % in terms of a solid. Next, each of said ink containment tube is taken out from each of the same aqueous solution, dried for a day under a room temperature, thereby forming a coating layer which contains PVA and fluorine-based surfactants in an inner wall surface of each of said ink containment tube. Regarding other Examples and Comparative Examples, the same was applied thereby forming the above mentioned coating layer on an inner wall surface of each of the ink containment tube.

TABLE 5

(wt %)

| Ionicity | | Example 22 | 23 | 24 | 25 | 26 | 27 | 28 | 29 | 30 |
|---|---|---|---|---|---|---|---|---|---|---|
| Treatment liquid composition | Polyvinyl alcohol PVA-105 Nonionic | 5.0 | 5.0 | 2.0 | 5.0 | 5.0 | 5.0 | 5.0 | 5.0 | 5.0 |
| | CM-318 Cationic | | | 0.1 | 0.1 | 0.01 | 0.1 | 1.0 | 5.0 | 0.1 |
| | KM-118 Anionic | | | | | | | | | |
| | Fluorine-based surfactant | | | | | | | | | |
| | SurflonS-111N Anionic | 0.15 | 0.45 | 0.15 | 0.03 | 0.15 | 0.15 | 0.15 | 0.15 | 0.3 |
| | SurflonS-121N Cationic | | | | | | | | | |
| | Water | 94.85 | 94.55 | 97.75 | 94.87 | 94.84 | 94.75 | 93.85 | 89.85 | 94.6 |
| | Total (total amount of coating liquid) | 100.0 | 100.0 | 100.0 | 100.0 | 100.0 | 100.0 | 100.0 | 100.0 | 100.0 |
| Self cleanable property after pipe treatment | Initial stage | ○ | ○ | ○ | ○ | ○ | ○ | ○ | ○ | ○ |
| | 20° C. Stored for 3 days | ○ | ○ | ○ | ○ | ○ | ○ | ○ | ○ | ○ |
| | 50° C. Stored for 3 days | X | X | ○ | ○ | ○ | ○ | ○ | ○ | ○ |

| Ionicity | | Example 31 | 32 | 33 | 34 | 35 | 36 | 37 | 38 |
|---|---|---|---|---|---|---|---|---|---|
| Treatment liquid composition | Polyvinyl alcohol PVA-105 Nonionic | 5.0 | 10.0 | | 5.0 | 5.0 | 5.0 | | 5.0 |
| | CM-318 Cationic | 0.1 | 0.1 | 10.0 | 0.1 | | | | |
| | KM-118 Anionic | | | | | 0.1 | 5.0 | 10.0 | 0.1 |
| | Fluorine-based surfactant | | | | | | | | |
| | SurflonS-111N Anionic | 0.45 | 0.15 | 0.15 | | | | | 0.15 |
| | SurflonS-121N Cationic | | | | 0.15 | 0.15 | 0.15 | 0.15 | |
| | Water | 94.45 | 89.75 | 89.85 | 94.75 | 94.75 | 89.85 | 89.85 | 94.75 |
| | Total (total amount of coating liquid) | 100.0 | 100.0 | 100.0 | 100.0 | 100.0 | 100.0 | 100.0 | 100.0 |
| Self cleanable property after pipe treatment | Initial stage | ○ | ○ | ○ | ○ | ○ | ○ | ○ | ○ |
| | 20° C. Stored for 3 days | ○ | ○ | ○ | ○ | ○ | ○ | ○ | ○ |
| | 50° C. Stored for 3 days | X | ○ | ○ | X | ○ | ○ | ○ | X |

Table Note)
PVA-105: trade name "KURARAY POVAL PVA-105" by KURARAY CO., LTD. (degree of saponification 98 to 99 mol %, degree of copolymerization 500)
CM-318: trade name "KURARAY POVAL CM-318" by KURARAY CO., LTD. (cationic modified polyvinyl alcohol, quaternary ammonium modified PVA, degree of saponification 86 to 91 mol %)
KL-118: trade name "KURARAY POVAL KL-118" by KURARAY CO., LTD. (anionic modified polyvinyl alcohol, degree of saponification 95 to 99 mol %)
Surflon S-111N: trade name "Surflon S-111N" by SEIMI CHEMICAL Co., Ltd. (anionic fluorine-based surfactant, concentration 30%), numerical values on the table is represented by wt % in terms of a solid content.
Surflon S-121N: trade name "Surflon S-121N" by SEIMI CHEMICAL Co., Ltd. (cationic fluorine-based surfactant, concentration 30%), numerical values on the table is represented by wt % in terms of a solid content.

Next, a pen tip with a ball diameter of 1 mm was assembled to one end of this ink containment tube, followed by filling an oily ink which contains 50 wt % of titanium oxide, 4 wt % of a rosin resin, 40 wt % of an aliphatic hydrocarbon-based solvent, and 1.5 wt % of a gelling agent (aluminum 2-ethyl-hexaonate) with respect to the total amount of the oily ink in said ink containment tube, further followed by filling a composition of a backflow inhibiting material on said oily ink which consists of 0.1 to 3 wt % of polyacrylic acid with respect to the total amount of the backflow inhibiting material whose molecular weight is not less than 1,000 (manufactured by BF Goodrich Co., Ltd., trade name "Carbopol 940") making diglycerin ethylene oxide adducts (manufactured by Sakamoto Yakuhin Kogyo CO., Ltd., trade name "SC-E 2000" as a base material contained in 98.5 wt % with respect to the total amount of the backflow inhibiting material.

When a coating is applied on paper using the above mentioned ink containment tube in which this oily ink and the backflow inhibiting material are contained, it is found that the backflow inhibiting material is hard to enter in the ink, an oily ink is hard to adhere to an ink such as correction liquid containment tube with usage, while developing sustained self cleanable property, and further, the remaining amount of the ink can clearly be confirmed since the ink containment tube is transparent.

In addition, when such an ink containment tube that is treated with an aqueous coating liquid containing ionic fluorine-based surfactant as said fluorine-based surfactant and modified polyvinyl alcohol which has opposite ionicity to that of said surfactant, even under the high temperature environment of 50° C., self cleanable effect can fully be maintained. For information, in the Table 5, "initial stage" in the evaluation of self cleanable property shows the stage when the ink is firstly applied at the time of assembling to a ball-point pen, "stored for 3 days" shows the state of self cleanable property when coated on a paper surface since the time of assembling to a ball-point pen.

INDUSTRIAL APPLICABILITY

The coating tools of the present invention can be used for coating tools such as correction pens and other coating tools.

What is claimed:
1. A coating tool, comprising:
an oily ink;
a backflow inhibiting material, the backflow inhibiting material being in contact with said oily ink and moving by following the fluidity of said oily ink in an ink containment tube, the backflow inhibiting material comprising
at least one base material component selected from the group consisting of diglycerin/ethylene oxide adducts and diglycerin/propylene oxide adducts, and
a gel composition which comprises polyacrylic acids, the polyacrylic acids being present in an amount of 0.1 to 3 wt % with respect to the total amount of said backflow inhibiting material; and
microparticle silica,
wherein said polyacrylic acids are composed of a plurality of polyacrylic acids with different average molecular weight and comprise polyacrylic acid having an average molecular weight between 1,000,000 and 2,000,000.
2. A coating tool, comprising
an oily ink;
a backflow inhibiting material, the backflow inhibiting material being in contact with said oily ink and moving by following the fluidity of said oily ink in an ink containment tube, the backflow inhibiting material comprising
at least one base material component selected from the group consisting of diglycerin/ethylene oxide adducts and diglycerin/propylene oxide adducts, and
a gel composition which comprises polyacrylic acids, the polyacrylic acids being present in an amount of 0.1 to 3 wt % with respect to the total amount of said backflow inhibiting material; and
microparticle silica,
wherein said polyacrylic acids are composed of a plurality of polyacrylic acids with different average molecular weight and comprise polyacrylic acid having an average molecular weight that is not less than 2,000,000 and polyacrylic acid having an average molecular weight between 1,000,000 and 1,500,000.
3. The coating tool as set forth in claim 2, wherein said base material component is contained in 87 to 99.9 wt % with respect to the total amount of said backflow inhibiting material.
4. The coating tool as set forth in claim 2, wherein said backflow inhibiting material contains microparticle silica in 1 to 10 wt % with respect to the total amount of the backflow inhibiting material.
5. The coating tool as set forth in claim 2, wherein the viscosity of said oily ink is not less than 700 mPa·s when the shearing rate is 0.1 (l/s) and not greater than 500 mPa·s when the shearing rate is 100 (l/s).
6. The coating tool as set forth in claim 2, wherein said oily ink comprises at least either of aliphatic hydrocarbon-based solvent or alicyclic hydrocarbon-based solvent.
7. The coating tool as set forth in claim 2, wherein said ink containment tube has a boundary which contacts with said oily ink and said backflow inhibiting material and at least comprising polyvinyl alcohol among polyvinyl alcohol and fluorine-based surfactant in said boundary.
8. The coating tool as set forth in claim 7, wherein said boundary is composed of a coating layer formed on an inner wall surface of said ink containment tube and at least polyvinyl alcohol among said polyvinyl alcohol and fluorine-based surfactant is contained in said coating layer.
9. The coating tool as set forth in claim 1, wherein said base material component is contained in 87 to 99.9 wt % with respect to the total amount of said backflow inhibiting material.
10. The coating tool as set forth in claim 1, wherein said backflow inhibiting material contains microparticle silica in 1 to 10 wt % with respect to the total amount of the backflow inhibiting material.
11. The coating tool as set forth in claim 1, wherein the viscosity of said oily ink is not less than 700 mPa·s when the shearing rate is 0.1 (l/s) and not greater than 500 mPa·s when the shearing rate is 100 (l/s).
12. The coating tool as set forth in claim 1, wherein said oily ink comprises at least either of aliphatic hydrocarbon-based solvent or alicyclic hydrocarbon-based solvent.
13. The coating tool as set forth in claim 1, wherein said ink containment tube has a boundary which contacts with said oily ink and said backflow inhibiting material and at least comprising polyvinylalcohol among polyvinyl alcohol and fluorine-based surfactant in said boundary.
14. The coating tool as set forth in claim 13, wherein said boundary is composed of a coating layer formed on an inner wall surface of said ink containment tube and at least polyvinyl alcohol among said polyvinyl alcohol and fluorine-based surfactant is contained in said coating layer.

15. A coating tool, comprising:
an oily ink;
a backflow inhibiting material, the backflow inhibiting material being in contact with said oily ink and moving by following the fluidity of said oily ink in an ink containment tube, the backflow inhibiting material comprising
at least one base material component selected from the group consisting of diglycerin/ethylene oxide adducts and diglycerin/propylene oxide adducts, and
a gel composition which comprises polyacrylic acids, the polyacrylic acids being present in an amount of 0.1 to 3 wt % with respect to the total amount of said backflow inhibiting material;
wherein said ink containment tube has a boundary which is in contact with said oily ink and said backflow inhibiting material, and
wherein said boundary includes polyvinyl alcohol and fluorine-based surfactant.

16. The coating tool as set forth in claim 15, wherein said polyvinyl alcohol comprises one or more ionic polyvinyl alcohol selected from a nonionic group, a cationic group, and an anionic group.

17. The coating tool as set forth in claim 15, wherein said fluorine-based surfactant comprises one or more ionic fluorine-based surfactant selected from the nonionic group, the cationic group, and the anionic group.

18. The coating tool as set forth in claim 15, wherein said fluorine-based surfactant comprises ionic fluorine-based surfactant and said polyvinyl alcohol comprises modified polyvinyl alcohol which has opposite ionicity to that of said surfactant.

19. The coating tool as set forth in claim 18, wherein said polyvinyl alcohol is a cationic modified polyvinyl alcohol and said fluorine-based surfactant is an 5 anionic fluorine-based surfactant or said polyvinyl alcohol is an anionic modified polyvinyl alcohol, and said fluorine-based surfactant is a cationic fluorine-based surfactant.

20. The coating tool as set forth in claim 15, wherein said ink containment tube is made up of a resin selected from a group consisting of a nylon resin, a polyethylene terephthalate resin, and a polybutylene terephthalate resin.

21. The coating tool as set forth in claim 15, wherein said oily ink comprises a colorant, a resin, an organic solvent, and a gelling agent.

22. The coating tool as set forth in claim 21, wherein the above mentioned gelling agent is a dissoluble gelling agent whose solubility (20° C.) to the above mentioned organic solvent is 0.1 to 20 wt % and the ink viscosity is not less than 700 mPa·s when the shearing rate is 0.1 (1/s) and the ink viscosity is not greater than 500 mPa·s when the shearing rate is 100 (1/s).

23. The coating tool as set forth in claim 21, wherein the oily ink comprises a metal soap as a gelling agent and at least either of aliphatic hydrocarbon-based solvent or alicyclic hydrocarbon-based solvent as organic solvent.

24. The coating tool as set forth in claim 23, wherein the above mentioned metal soap is aluminum 2-ethylhexanoate.

25. The coating tool as set forth in claim 21, wherein said colorant comprises titanium oxide.

26. The coating tool as set forth in claim 15, wherein said oily ink comprises at least either of organic solvent of aliphatic hydrocarbon-based solvent or alicyclic hydrocarbon-based solvent.

27. A coating tool containing
an oily ink;
a backflow inhibiting material, the back flow inhibiting material being in contact with said oily ink; and
an ink containment tube, the oily ink and the backflow inhibiting material being contained within the ink containment tube,
wherein the ink containment tube is made up of a resin selected from the group of a nylon resin, a polyethylene terephthalate resin, and polybuthylene terephthalate resin,
the ink containment tube has a boundary which is in contact with said oily ink and said backflow inhibiting material,
polyvinyl alcohol and fluorine-based surfactant are contained in said boundary,
ionic fluorine-based surfactant is contained as said fluorine-based surfactant,
modified polyvinyl alcohol which has opposite ionicity to that of said surfactant is contained as said polyvinyl alcohol,
said oily ink comprises a colorant, a resin, an organic solvent and a gelling agent, at least either of aliphatic hydrocarbon-based solvent or alicycic hydrocarbon-based solvent being included as said organic solvent, and a metal soap being included as said gelling agent,
said backflow inhibiting material comprises
at least one base material component selected from the group of diglycerol/ethylene oxide adducts and diglycerol/propylene oxide adducts and
a gelling composition comprising polyacrylic acid, the polyacrylic acid being included in an amount of 0.1 to 3 wt % with respect to the total amount of said backflow inhibiting material.

28. The coating tool as set forth in claim 27, wherein the above mentioned metal soap is aluminum 2-ethylhexaonate.

29. The coating tool as set forth in claim 1, having a pen tip at one end of said ink containment tube and having a pressure device which pressurizes at least the oily ink contained in said ink containment tube at the other end.

30. A backflow inhibiting material for an oily ink made up of at least one base material component selected from the group of diglycerol/ethylene oxide adducts and diglycerol/propylene oxide adducts and a gelling agent comprising microparticle silica, polyacrylic acid whose average molecular weight is not less than 2,000,000 and polyacrylic acid whose average molecular weight is not greater than 1,500,000, and the above mentioned polyacrylic acid is contained in 0.1 to 3 wt % with respect to the total amount of said backflow inhibiting material.

* * * * *